United States Patent [19]
Worner et al.

[11] Patent Number: 4,904,225
[45] Date of Patent: Feb. 27, 1990

[54] DIVIDED FLYWHEEL

[75] Inventors: Gunter Worner, Kernen; Ernst Tscheplak, Weinstadt, both of Fed. Rep. of Germany

[73] Assignee: Daimler-Benz, Stuttgart, Fed. Rep. of Germany

[21] Appl. No.: 217,409

[22] Filed: Jul. 11, 1988

[30] Foreign Application Priority Data

Jul. 11, 1987 [DE] Fed. Rep. of Germany ....... 3723015

[51] Int. Cl.$^4$ ................ F16F 15/12; F16F 15/30; F16D 13/60
[52] U.S. Cl. ................................ 464/67; 74/574; 192/106.2; 464/68
[58] Field of Search ................ 74/574; 192/106.2; 464/64, 66, 67, 68

[56] References Cited

U.S. PATENT DOCUMENTS

| | | | |
|---|---|---|---|
| 2,002,115 | 5/1935 | Kjaer | 464/67 X |
| 3,095,716 | 7/1963 | Smirl | 464/68 |
| 4,714,449 | 12/1987 | Woerner et al. | 464/68 |
| 4,727,970 | 3/1988 | Reik et al. | 192/106.2 X |
| 4,782,718 | 11/1988 | Hartig et al. | 192/106.2 X |

FOREIGN PATENT DOCUMENTS

| | | | |
|---|---|---|---|
| 3315484 | 10/1984 | Fed. Rep. of Germany | 464/66 |
| 3629225 | 3/1987 | Fed. Rep. of Germany | |
| 2066416 | 7/1981 | United Kingdom | 464/67 |
| 2171174 | 8/1986 | United Kingdom | 192/106.2 |
| 2193790 | 2/1988 | United Kingdom | 192/106.2 |

OTHER PUBLICATIONS

"The Two-Mass Flywheel-A Torsional Vibration Damper for the Power Train of Passenger Cars-State of the Art and Further Technical Development", Sebulke, SAE Technical Paper Series #870394, pp. 1-10, Feb. 1987.

Primary Examiner—Daniel P. Stodola
Attorney, Agent, or Firm—Barnes & Thornburg

[57] ABSTRACT

Flywheel elements are coupled by a spring arrangement having an intermediate support which is connected resiliently to one flywheel element by long-stroke arcuate helicoidal springs and to the other flywheel element through short-stroke springs. A stop spring device becomes operative between the intermediate support and the one flywheel element in the case of major relative rotations. Additionally or alternatively, a slip coupling which exhibits play may also be arranged. At higher speeds, the long-stroke springs abut bearing surfaces. The friction thereby caused produces a stiffening of the long stroke springs. The mobility of the flywheel elements relative to each other therefore increases with decreasing speed.

13 Claims, 4 Drawing Sheets

DIVIDED FLYWHEEL

BACKGROUND AND SUMMARY OF THE INVENTION

The invention relates to a divided flywheel having two coaxial flywheel weights or flywheel elements and a spring arrangement arranged between them, having an intermediate support coaxial with the flywheel elements, which is coupled propulsively to the respective flywheel elements through a separate spring set permitting a relative rotation between the intermediate support and the flywheel elements.

Divided flywheels can be arranged on internal combustion engines instead of conventional one-part flywheels, in order to isolate the transmission line and the engine vibrationally from each other.

Due to the type of construction described above, the spring arrangement gives the flywheel elements or flywheel weights comparatively great rotary mobility relative to each other, which is dictated by the sum of the possible spring strokes of the springs sets.

The great relative mobility of the flywheel elements or flywheel weights is desirable particularly when strong jolts occur in the transmission line, for example when a clutch arranged between the engine and the transmission line is engaged abruptly. A comparatively great rotary mobility of the flywheel elements or flywheel weights relative to each other is furthermore also desirable at lower engine speeds, at which speeds an internal combustion engine generally tends to generate shaking vibrations.

The design of the divided flywheel is made such that the flywheel always operates in its so-called hypercritical range under normal operating conditions, that is to say the vibrations occurring at the flywheel have a frequency above the resonance frequency. The resonance frequency can accordingly be generated virtually only when starting the engine or when the engine is stalled.

In previous divided flywheels of the type described above, the great relative mobility of the flywheel elements or flywheel weights, desirable per se, can possibly lead to disturbing effects. Thus, for example, at higher engine speeds, at which the flywheel weights or flywheel elements execute rotary vibrations relative to each other of only relatively small amplitudes, disturbing vibrations of the intermediate support can be generated. Furthermore, during reactions to load changes, undesirably strong vibrations can be generated between the flywheel weights or flywheel elements.

Lastly, the great relative mobility of the flywheel weights or flywheel elements is rather disadvantageous in the case of prolonged generation of the resonance frequency.

It is therefore an object of the present invention to produce a divided flywheel with decidedly improved operational behavior.

This object is achieved in a flywheel of the type described above, in that a first spring set comprises long-stroke helicoidal springs which extend along a circular arcuate helical axis with a center of curvature lying on the flywheel axis. This first spring set operates with friction as a function of centrifugal force by said springs being urged by the centrifugal force against bearing surfaces arranged on the intermediate support and on the one flywheel element and bracing the springs radially outwards relative to the flywheel axis. A stop spring device is provided which is operative in the case of major relative rotation, and/or a slip coupling is provided which exhibits play, to be arranged between the intermediate support and the one flywheel element. A second spring set is provided which couples the intermediate support and the other flywheel element or the other flywheel weight, and comprises of relatively short-stroke and hard springs which operate with no or little friction even for major centrifugal forces.

The long-stroke helicoidal springs of the first spring set permit comparatively great relative rotations between the flywheel elements or flywheel weights at low engine speeds, so that the vibrational isolation of transmission line and engine is ensured even when vibrations of greater amplitude occur. Extremely quiet running is then accordingly ensured even at low operating speeds.

At higher speeds, the long-stroke springs become increasingly harder, because the centrifugal forces which increase with increasing speed cause increasing friction between the long-stroke springs and the bearing surfaces. A desirable hardening of the flywheel is achieved by this means, that is to say, during load changes no vibrations with excessively great vibration amplitudes can be generated between the flywheel elements or flywheel weights. The vibrational isolation between engine and transmission line at higher speeds can be ensured solely by the short-stroke springs of the other spring set, since the higher-frequency vibrations which occur at higher speeds have only a small amplitude. The hardening of the long-stroke springs simultaneously prevents the intermediate support from being able to execute large-amplitude rotary vibrations relative to the flywheel elements or flywheel weights.

At extremely low speeds and/or in the resonance range, destructive vibrations are prevented by the slip coupling which exhibits play and/or by the stop spring device, which become operative in the case of major relative movements between the intermediate support and the one flywheel element or the one flywheel weight and operate in the sense of hardening the long-stroke springs.

As an advantageous development of certain preferred embodiments of the invention, the spring sets are arranged superposed radially relative to the flywheel axis, while the spring set with the long-stroke springs is preferably positioned radially externally.

The bearing surfaces for the long-stroke springs are preferably constructed on a flywheel element as a bed of U-shaped or circular cross-section, it being contemplated for the bed to be lined with an antifriction layer on the side which braces the springs radially outwards. The bed provides the springs with a real bracing, the antifriction layer counteracts any excessive increase in the friction in the case of major centrifugal forces.

The bed may also form an annular chamber filled with lubricant according to certain preferred embodiments. In this case, on the one hand, the lubricant contributes to reduced wear of the springs, and on the other hand the hydraulic resistance of the lubricant acts as a vibration damper.

Abutment elements mutually opposite in the axial direction of the flywheel may be arranged at the end faces of the bearing surfaces according to certain preferred embodiments, the distance between which elements is shorter than the diameter of the long-stroke springs, and which exhibit mutually opposite openings or ports tangential to the flywheel axis, in which further helicoidal springs serving as resilient stops are fastened in cage fashion. In this case, the intermediate support engages by prolongations movable between the abutment elements with play in the circumferential direction into the space between the long-stroke springs and the further springs. This arrangement is conveniently provided in such a way that the prolongations are arranged respectively at both ends of the long-stroke springs and have a distance between them in the circumferential direction which corresponds to the distance between the abutment elements. Accordingly, in the case of relative rotation between the one flywheel element or the one flywheel weight and the intermediate support, the long-stroke springs are respectively compressed between the abutment elements at one end of the springs and one of the prolongations of the intermediate support, while the prolongation at the one end of the springs lifts from the latter and cooperates with the stop spring device in the case of a major relative rotation between the one flywheel element or the one flywheel weight and the intermediate support.

As an advantageous structural development of certain preferred embodiments, the slip coupling which exhibits play, which is preferably additionally operative between the intermediate support and the one flywheel element, may be arranged in the region of the internal circumference of the intermediate support, it being contemplated for spring elements which urge friction elements or friction rings of the coupling together to serve simultaneously to maintain firmly a bearing shell, associated with the one flywheel element, of a bearing fastening the other flywheel element.

Other objects, advantages and novel features of the present invention will become apparent from the following detailed description of the invention when considered in conjunction with the accompanying drawings.

DETAILED DESCRIPTION OF THE DRAWINGS

Figure 1:
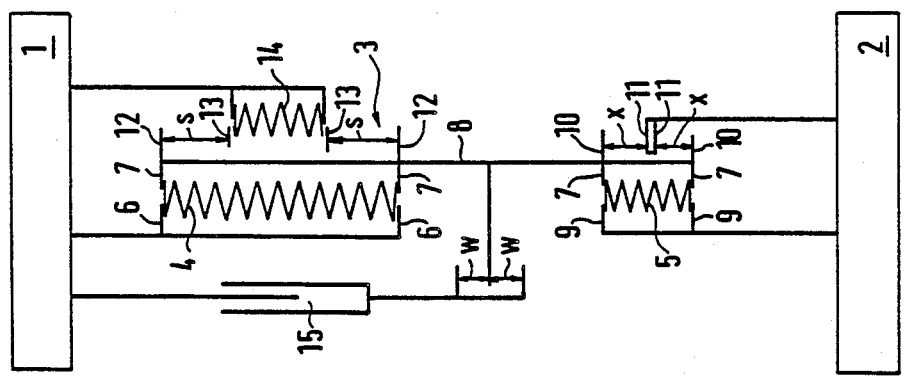
FIG. 1 shows a diagrammatic illustration of a divided flywheel according to preferred embodiments of the invention.

In FIG. 1, the two flywheel elements 1 and 2 are respectively illustrated diagrammatically as heavy bodies which are coupled together by a spring arrangement 3, so that the flywheel elements 1 and 2 can vibrate relative to each other, the flywheel elements 1 and 2 approaching or receding from each other. In reality, the flywheel elements 1 and 2 execute rotary vibrations relative to each other, in FIG. 1 said vibrations are represented as purely translatory movements.

The spring arrangement 3 has the spring sets 4 and 5, the springs of the spring set 4 being arranged between abutments 6 on the flywheel element 1 and abutments 7 on an intermediate support 8. The springs of the spring set 5 are arranged between further abutments 7 on the intermediate support 8 and abutments 9 of the flywheel 1 and/or 2, such that, in the case of relative movements between the intermediate support 8 and the flywheel element 1 and/or 2, the springs are compressed more or less strongly between abutment 7 on the intermediate support and one of the abutments 6 or 9 on the flywheel elements 1 or 2, namely independently of the respective direction of relative movement of the flywheel elements 1 and 2 and the intermediate support 8.

The mobility of intermediate support 8 and flywheel element 2 relative to each other is limited by stops 10 and counterstops 11 which become operative in both possible directions of movement when intermediate support 8 and flywheel element 2 are deflected relative to each other by a distance x out of the central position illustrated.

The relative mobility between the intermediate support 8 and the flywheel element 1 is also limited by stops 12 and counterstops 13. Here the counterstops 13 are braced resiliently by means of spring 14 on the flywheel element 1, such that not only the springs 4, but also the springs 14 become operative between the flywheel element 1 and the intermediate support 8 as soon as the intermediate support 8 moves relative to the flywheel element 1 out of the central position illustrated by more than a distance s.

Lastly, a slip coupling 15, which exhibits play, is further arranged parallel to the springs of the spring set 4, such that the intermediate support 8 exhibits a mobility 2 w, without the slip coupling 15 becoming operative, in all possible positions relative to the flywheel element 1. In the position illustrated in FIG. 1, the intermediate support 8 can move a distance w in each of two directions relative to the flywheel element 1 before the slip coupling 15 becomes operative. As soon as the slip coupling 15 becomes operative in one direction of movement of the intermediate support 8 relative to the flywheel element 1, the intermediate support 8 can move a distance 2 w in the respective opposite direction relative to the flywheel element 1 without actuation of the slip coupling 15.

Figure 2:
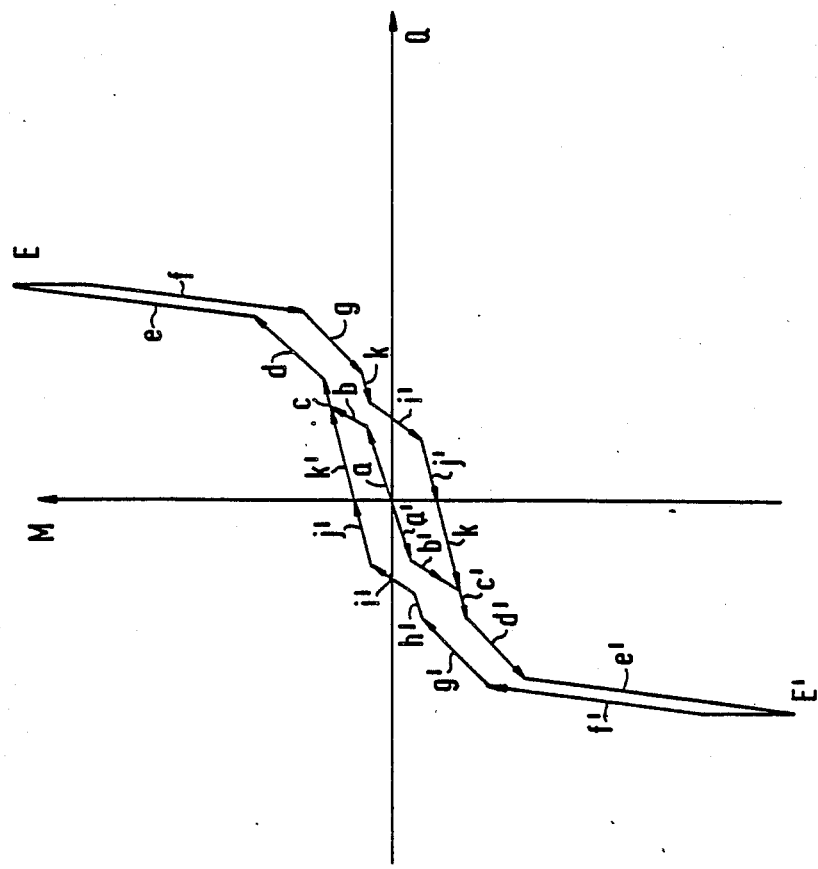
FIG. 2 shows a graph depicting the dependence of the torques (M) acting and/or to be overcome between the flywheel weights or flywheel elements as a function of the relative deflection (a) of the flywheel elements.

The flywheel illustrated in FIG. 1 is preferably coordinated such that the operating behavior illustrated in FIG. 2 is obtained. Let the flywheel elements 1 and 2 first of all be deflected relative to each other in one direction. The spring sets 4 and 5 then become increasingly compressed, so that they offer an increasing resistance, corresponding to the curve section a, to the movement of the flywheel elements 1 and 2, until the play w of the slip coupling 15 is consumed. Upon further movement of the flywheel elements 1 and 2, at first only the spring set 5 is now increasingly compressed, corresponding to the curve section b, since the slip coupling 15 initially prevents any further compression of spring set 4. The slope of the curve section b is dictated by the spring characteristic of the spring set 5. In the case of a still further movement of the flywheel elements 1 and 2, the slip coupling 15 can slip, so that both spring sets 4 and 5 become increasingly compressed, corresponding to the curve section c, until the stops 10 and counterstops 11 (compare FIG. 1) cooperate and prevent any further compression of the spring set 5. In the case of a further movement of the flywheel elements 1 and 2, only the spring set 4 accordingly continues to be increasingly compressed, corresponding to the curve section d. Now as soon as the stops 12 and counterstops 13 (compare FIG. 1) cooperate with each other, the stop springs 14 become additionally operative, so that a strongly increasing resistance is opposed to any further movement of the flywheel elements 1 and 2, corresponding to the curve section e.

If the flywheel elements 1 and 2 had moved in the opposite direction out of the position illustrated in FIG. 1, then the resistance counteracting the respective movement would be represented by the curve sections a' to e'.

When the direction of movement of the flywheel elements is reversed at the end points E or E' of the curve sections e and e', a hysteresis effect occurs, because the slip coupling 15 is initially inoperative in this direction of movement. At first the spring sets 4 and the stop springs 14 relax, corresponding to the curve sections f and f', until, upon a further return movement of the flywheel elements 1 and 2, the stops 12 and counterstops 13 lift off each other and the stop springs 14 have at first no influence upon the further return movement of the flywheel elements 1 and 2. Then the springs of the spring set 4 at first relax further, corresponding to the curve sections g and g', until in accordance with the curve sections h or h', not only the springs of the spring set 4 but also the springs of the spring set 5 become somewhat relaxed, in which case the play of the slip coupling 15 is again consumed, so, upon a further return movement of the flywheel elements 1 and 2, once more only the springs of the spring set 5 can relax at first, in accordance with the curve sections i and i', until the slip coupling 15 slips again and the springs of the spring sets 4 and 5 can expand to their maximum structurally possible length, corresponding to the curve sections j and j'. If the movement of the flywheel elements 1 and 2 is continued without a change of direction, then the springs of the spring sets 4 and 5 become increasingly tensioned, corresponding to the curve sections k and k', which prolong the curve sections j and j' in a straight line and merge in a straight line into the curve sections c and c'. Then the curve sections d and d' and e and e' et cetera are traveled again.

The flywheel shown in skeleton in FIG. 1 is therefore designed such that the stops 10 and counterstops 11 which limit the spring stroke of the spring set 5 become operative before the springs of the spring set 4 become compressed so much that the stop springs 14 also counteract any further movement of the flywheel elements 1 and 2.

In the example of FIGS. 3 to 6, the flywheel element 1 is connected to an internal combustion engine, whereas the flywheel element 2 may be coupled through a clutch, not shown, to a transmission line.

The flywheel element 2 is mounted by means of a grooved ball bearing 20 upon a central hub part 21 of the flywheel element 1. The flywheel element 1 consists substantially of two parts, a part 1' connected integrally to the hub part 21, and an annular disc-shaped part 1", which is connected by flanges to the part 1' by means of a ring of screws at the outer circumference.

An annular space open towards the hub part 21 remains between the parts 1' and 1" of the flywheel element 1. This annular space has in its radially outer region two sections of approximately circular cross-section with a relatively great length in the circumferential direction of the flywheel. Said sections, which are lined with an antifriction layer 22 on their radial exterior, serve as spring chambers for long-stroke helicoidal springs 23 which form the spring set 4 of FIG. 1. The helicoidal springs 23 have a curved helical axis, the center of curvature of which lies on the axis of the flywheel. Hat-shaped stop pieces 24 are inserted into the end faces of the helicoidal springs 23 in the manner shown in FIGS. 3 and 4.

The helicoidal springs 23 seek to thrust these stop pieces 24 against abutment pieces 25 arranged between them on the flywheel element 1, which are respectively designed as mutually opposite pairs with an axial distance in between on the parts 1' and 1" of the flywheel element 1 as circular arcuate discs in the axial elevation of the flywheel. The axial distance between the abutment pieces 25 is shorter than the external diameter of the helicoidal springs 23 and of the stop pieces 24.

The abutment pieces 25 have mutually facing ports, into which short-stroke helicoidal springs 26, which correspond to the springs 14 in FIG. 1, are inserted in cage fashion. The helicoidal springs 26, the diameter of which is greater than the axial distance between the abutment pieces 25, and also the ports receiving them in the abutment pieces 25, are arranged tangentially to the flywheel axis. As FIGS. 3 and 4 show, the helicoidal springs 26 may be arranged asymmetrically within the abutment pieces 25, such that the one end faces of the abutment pieces 25 are at a greater distance from the corresponding ends of the springs 26 than the other end faces.

The disc-shaped intermediate support 8 is arranged between the parts 1' and 1" of the flywheel element 1 and has on its external circumference radial projections 27 which are movable in the space between the abutment pieces 25. Projections 27 engage respectively into the space between the springs 23 and 26, the radial edges of the projections 27 facing the helicoidal springs 23 on both sides of the helicoidal spring 26 in each case having the same distance from each other in the circumferential direction as the end faces of the abutment pieces 25. The radial edges, respectively facing the helicoidal springs 26, of adjacent projections 27 have a distance between which is greater in the circumferential direction of the flywheel than the length of the helicoidal springs 26, a play 2s being present overall.

Due to the arrangement described, in the case of a relative rotation between the intermediate support 8 and the flywheel element 1, the helicoidal springs 23 are respectively compressed between one of the projections 27 at one respective end of the helicoidal springs 23 and the abutment pieces 25 at the respective other end of the helicoidal springs 23. In the case of a sufficiently great relative rotation, the projections 27 adjacent to the other ends of the helicoidal springs 23 then cooperate simultaneously with the helicoidal springs 26, which then become compressed between the last mentioned projections 27 and the radial edges, opposite the latter in the axial direction of the helicoidal springs 26, of the ports receiving the helicoidal springs 26 in the abutment pieces 25.

Figure 3:
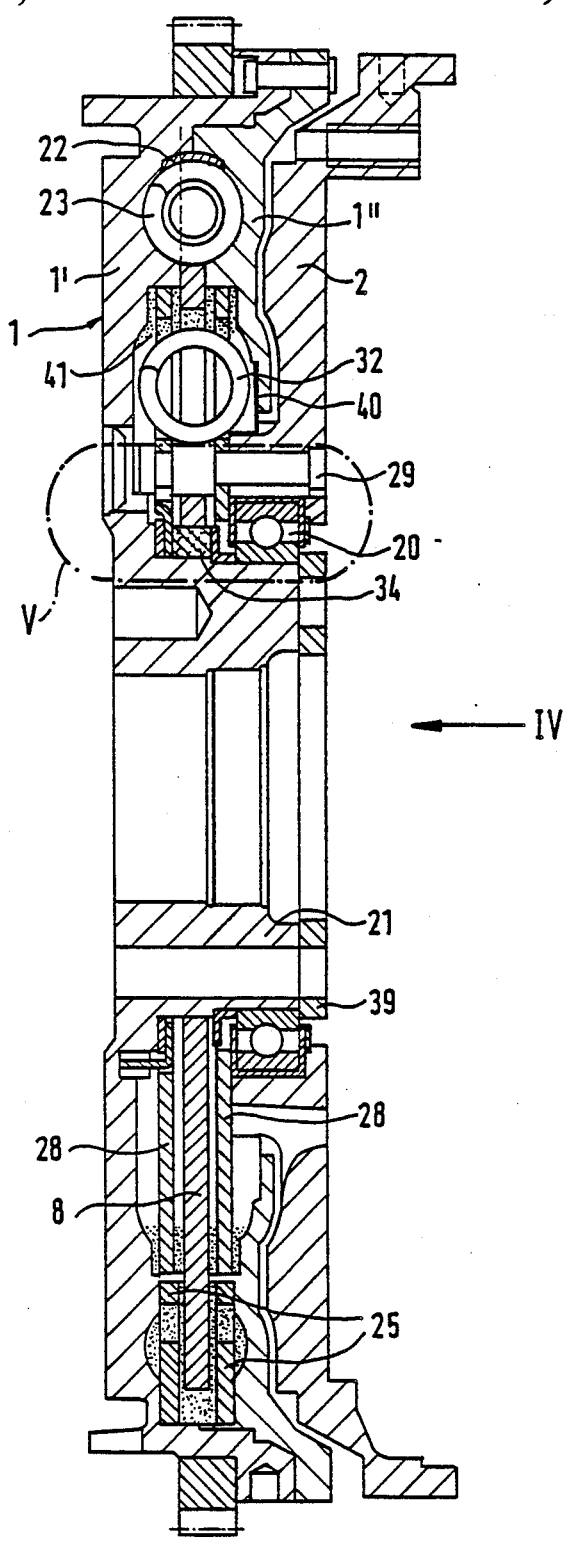
FIG. 3 shows an axial section of a preferred embodiment of a flywheel constructed according to the invention.
Figure 4:
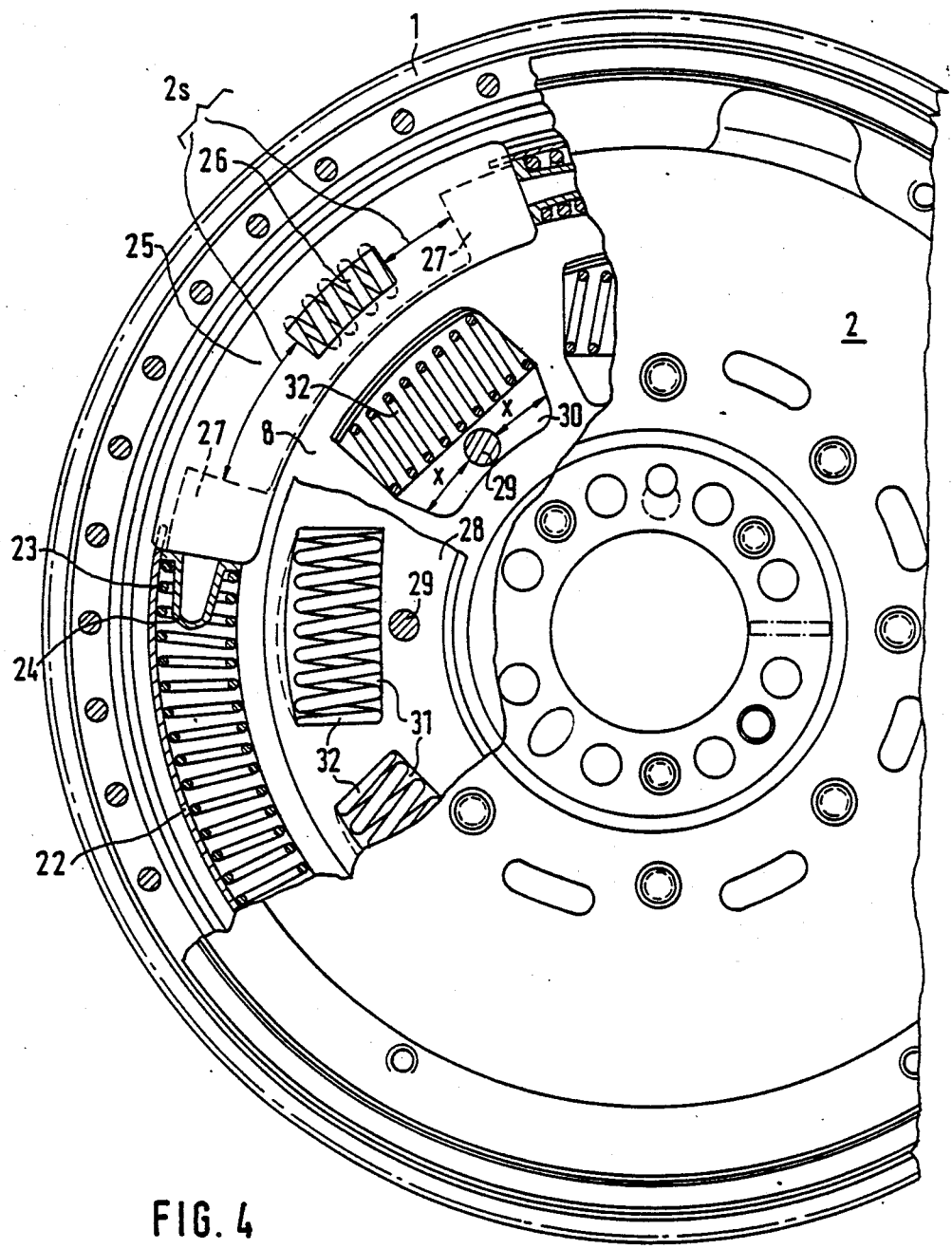
FIG. 4 shows an axial part sectional elevation taken in the direction of arrow IV in FIG. 3.

In the arrangement shown in FIGS. 3 and 4, the intermediate support 8 can rotate relative to the flywheel element 1 through a greater angle clockwise than in the opposite direction before the one projections 27 cooperate with the helicoidal springs 26. The clockwise relative rotation of the intermediate support 8 occurs during overrun, that is to say for example when the speed of the engine is increased counter to the resistance of the transmission line.

The radially inner region of the disc-shaped intermediate support 8 is arranged axially between two annular discs 28 which are connected integrally in rotation to the flywheel element 2 by means of bolts 29. Between the annular discs 28, the bolts 29 carry an increased thickness or bushings in order to maintain the annular discs 28 at an axial distance from each other, as FIG. 4 shows.

The bolts 29, or their thickened region or the like, penetrate ports 30 arranged in the intermediate support 8, which cooperate with the bolts 29 in order to limit the rotatability of the intermediate support relative to the flywheel element 2. An overall movement play 2 x in the circumferential direction of the flywheel is available for the bolts 29 within the ports 30.

On both sides of the ports 30, ports 31 are arranged in the annular discs 28 tangentially to the flywheel axis. The length of the ports 31 in the circumferential direction has the same dimension as the ports 30 of the intermediate support 8. Short-stroke helicoidal spring set 5 in FIG. 1, are inserted respectively into the ports 31 and 30. The diameter of the helicoidal springs 32 is greater than the axial distance between the annular discs 28, so that the helicoidal springs 32 are retained in cage fashion in the ports 31 of the annular discs 28. Upon relative rotation between the intermediate support 8 and the flywheel element 2, the helicoidal springs 32 respectively become compressed between mutually opposite radial edges of the ports 30 and 31 to a reduced length which corresponds to the length of the overlap region of the ports 30 and 31 in the circumferential direction of the flywheel.

Figure 5:
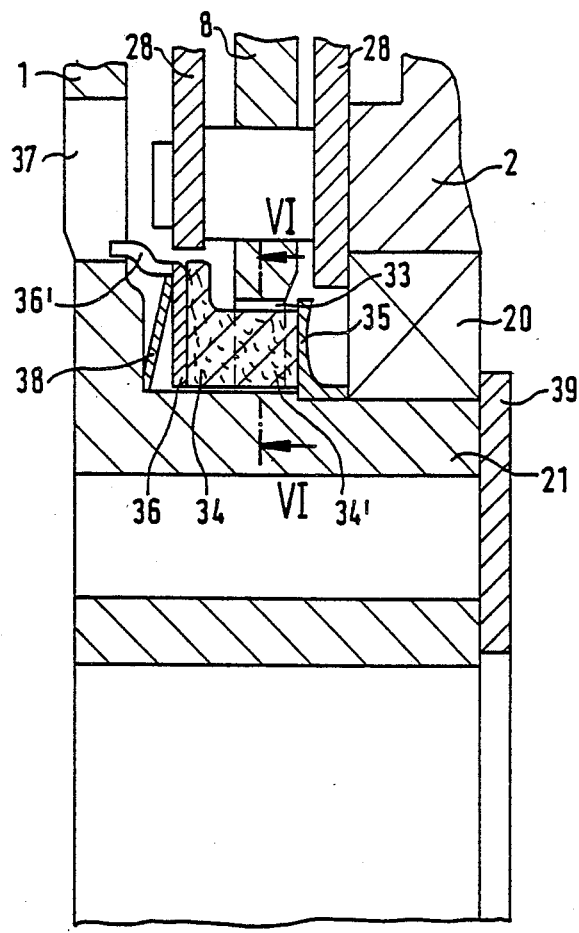
FIG. 5 shows a detail V from FIG. 3.
Figure 6:
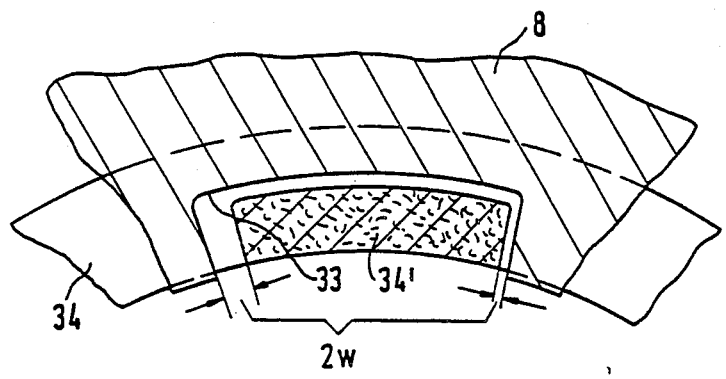
FIG. 6 shows a sectional view taken along line VI—VI in FIG. 5.

The intermediate support 8 according to FIGS. 5 and 6 has on its internal circumference, which embraces the hub part 21 of the flywheel element 1, recesses 33 which receive axial prolongations 34' of a friction ring 34. The axial prolongations of the friction ring have overall within the recesses 33 a play 2 w in the circumferential direction of the flywheel. The prolongations facing the bearing 20 abut a bracing ring 35 with an angular profile, one member of which, which embraces the hub part 21, is in contact with the bearing shell on the hub part side of the grooved ball bearing 20. The friction ring 34 cooperates by its end face remote from the prolongations with a counterfriction ring 36 which is arranged axially slidably on the hub part 21 and maintained firmly against rotation relative to the flywheel element 1 by means of angled prolongations 36', by the prolongations 36' engaging into axial recesses 37 of the part 1' of the flywheel element 1. An annular plate spring 38 is clamped axially between the part 1' of the flywheel element 1 and the counterfriction ring 36 and urges the counterfriction ring 36 against the friction ring 34, and the latter by its prolongations against the bracing ring 35, which then in turn urges the bearing shell of the bearing 20 on the hub part 21 against an annular flange 39 arranged on the hub part 21. The plate spring 38 therefore has a dual function, that is to say on the one hand it presses the friction ring 34 and counterfriction ring 36 together, furthermore the plate spring 38 secures the position of the inner bearing shell of the grooved ball bearing 20 on the hub part 21. Friction lamellae, not yet illustrated, may be arranged between the friction ring 34 and the counterfriction ring 36 in order to increase the friction between these rings.

Therefore, as soon as the intermediate support 8 is rotated sufficiently far relative to the flywheel element 1 for the movement play of the prolongations of the friction ring 34 in the recesses 33 to be consumed, the intermediate support 8 entrains the friction ring 34 in its further movement, that is to say that, during the further movement of the intermediate support 8 relative to the flywheel element 1, the frictional resistance counteracts the slip coupling formed by the rings 34 and 36, which corresponds to the slip coupling 15 in FIG. 1.

A seal element 40 may be arranged between the inner circumferential edge of the part 1'' of the flywheel element 1 and an angular step on the flywheel element 2 which engages somewhat under side inner circumferential edge, so that there is formed between the flywheel elements 1 and 2 a closed annular space extending between the parts 1' and 1'' of the flywheel element 1, which can receive a lubricant which is urged radially outwards during rotation of the flywheel and thereby fills the annular space outside an annular surface 41 and thus, particularly, fills the space occupied by the helicoidal springs 23. In addition to a lubrication of said springs 23, a hydraulic damping of the spring movements is also achieved by this means, because hydraulic medium has to be displaced between the hat-shaped stop pieces 24 upon each compression of the helicoidal springs 23.

At low speed, the flywheel illustrated in FIGS. 3 to 6 behaves substantially according to the graph in FIG. 2. At higher speeds, it must be taken into consideration additionally that the helicoidal springs 23 are urged against the antifriction layer 22 with increasing force due to the centrifugal force, and can accordingly only execute spring strokes counter to a frictional resistance which is a function of the centrifugal force. At higher speeds, the helicoidal springs 23 therefore form an extremely hard connection between the flywheel element 1 and the intermediate support 8, so that the flywheel elements 1 and 2 are substantially rotatable relative to each other only counter to the resistance of the helicoidal springs 32. This takes into consideration the fact that at higher speeds few vibrations can be generated by the engine in any case, so that the springs 32 are totally sufficient for the vibrational isolation between engine and transmission line or between the flywheel elements 1 and 2. The helicoidal springs 23 become increasingly operative only at lower speeds, so that the flywheel elements 1 and 2 can execute relatively extended mutual movements, as is desirable at lower speeds, because stronger vibrations may then be generated by the engine. According to the invention, a relatively long stroke is then available for the vibrational isolation of the flywheel elements 1 and 2.

Destructive natural vibrations of the intermediate support 8 or excessive movements of the flywheel elements 1 and 2 relative to each other, particularly when passing through the resonance range, are prevented particularly by the slip coupling (designated 15 in FIG. 1) formed by the friction rings 34 and 36 and the helicoidal springs 26, which counteract any excessive movement of the intermediate support relative to the flywheel element 1.

Although the present invention has been described and illustrated in detail, it is to be clearly understood that the same is by way of illustration and example only, and is not to be taken by way of limitation. The spirit and scope of the present invention are to be limited only by the terms of the

What is claimed is:

1. Divided flywheel comprising:

first and second coaxial flywheel elements with flywheel weights distributed therebetween and a slip coupling means and spring arrangement which partly exhibits play and couples the flywheel elements, said slip coupling means and spring arrangement comprising:

an intermediate support coaxial with both flywheel elements and coupled propulsively to the first flywheel element through said slip coupling means and to both flywheel elements through respective separate soft and hard helicoidal spring sets, one of the helicoidal spring sets comprising springs having a circular arcuate helical axis with a center of curvature lying on the flywheel axis, said intermediate support, through the slip coupling means and the separate soft and hard helicoidal spring sets, providing the sole coupling between both flywheel elements, wherein the hard spring set, which coupled the intermediate support to the second flywheel element comprises relatively short-strike springs which are relatively unaffected by centrifugal force during high speed rotation of the first flywheel element, wherein the soft spring set, which couples the intermediate support to the first flywheel element, is formed by the helicoidal springs have the circular arcuate helical axis, wherein the springs of the soft spring set are soft enough and with such a long stroke that they will also operate as a stiffened spring to provide an additional friction force as a function of centrifugal force as the soft spring set is urged by centrifugal force, occasioned by the first flywheel element, radially outwards against bearing surfaces on the intermediate support and on the first flywheel element during high speed rotation of the first flywheel element;

wherein during low rotational speeds the soft springs will not be acted on by the additional force, and wherein there is at least one stop spring means operative only in the case of major relative rotation between the first flywheel element and the intermediate support to add resistance to the soft spring set, and wherein the slip coupling means which exhibits play is arranged in parallel with the soft spring set and operates at relative speeds between the two flywheel elements above a predetermined relative speed to effectively disengage the soft spring set from the hard spring set so that the first flywheel element is operatively coupled to the second flywheel element via the slip coupling means and the hard spring set; and wherein during low rotational speeds of the first flywheel element, both the hard and soft spring sets operatively couple the first and second flywheel elements through the intermediate support.

2. Divided flywheel according to claim 1, wherein the spring sets are arranged superposed radially relative to the flywheel axis.

3. Divided flywheel according to claim 1, wherein the bearing surfaces for the long-stroke springs are constructed on the first flywheel element as a bed of at least one of a U-shaped and circular cross-section.

4. Divided flywheel according to claim 3, wherein the bed is lined with an antifriction layer, at least on the side which braces the springs radially outwards.

5. Divided flywheel according to claim 1, wherein abutment lements mutually opposite in the axial direction of the flywheel are arranged at the end faces of the bearing surfaces, the distance between which elements is shorter than the diameter of the long-stroke helicoidal springs, and which exhibit mutually opposite openings or ports tangential to the flywheel axis, in which further helicoidal springs serving as resilient stops are fastened in cage fashion, and wherein the intermediate support engages by prolongations movable between the abutment elements with play in the circumferential direction into the space between the long-stroke springs and the further springs.

6. Divided flywheel according to claim 5, wherein the distance in the circumferential direction between the prolongations respectively arranged on either side of the long-stroke helicoidal springs corresponds to the distance between the abutment elements at the end faces of the bearing surfaces.

7. Divided flywheel according to claim 6, wherein the intermediate support is arranged axially between two disc parts arranged on the other flywheel element, which exhibit a plurality of ports tangential to the flywheel axis, in which the helicoidal springs of the other spring set are received in cage fashion, and in that radial spokes or prolongations are arranged on the intermediate support between the springs of said spring set.

8. Divided flywheel according to claim 7, wherein the intermediate support is limitedly rotatable relative to the other flywheel part by bolts which serve to fasten the disc parts cooperating with the spokes or prolongations as stops.

9. Divided flywheel according to claim 8, wherein the intermediate support is connected to a friction ring part by prolongations extending in the axial direction of the flywheel into recesses of the intermediate support, and wherein the friction ring part is tensioned axially against a counterfriction part which is fastened to the one flywheel element.

10. Divided flywheel according to claim 9, wherein the prolongations are arranged in the recesses, with play in the circumferential direction and the counterfriction part is arranged with play in the circumferential direction.

11. Divided flywheel according to claim 10, wherein a central axial prolongation or hub part is arranged on the one flywheel element, upon which prolongation or hub part the other flywheel element is mounted for rotation with interposition of a bearing, and wherein the inner bearing shell of the bearing is tensioned axially against an annular member arranged on the axial prolongation or hub part by the friction ring part being arranged axially between two pressure rings, slidable axially on the axial prolongation or hub part, one of which is braced against the bearing shell and the other is tensioned towards the bearing shell by means of a spring arrangement.

12. Divided flywheel according to one claim 10, wherein a central axial prolongation or hub part is arranged on the one flywheel element, upon which prolongation or hub part the other flywheel element is mounted for rotation with interposition of a bearing, wherein the inner bearing shell of the bearing is tensioned against an annular member arranged on the axial prolongation or hub part by the friction ring part being arranged axially between two pressure rings, and wherein the inner bearing shell and the one pressure ring or friction ring adjacent to the bearing shell is arranged as the abutment of a plate spring ring which urges the last mentioned pressure ring away from the bearing shell against an abutment which cooperates with the other friction ring.

13. Divided flywheel according to claim 1, wherein the bed which receives the long-stroke helicoidal springs is arranged as part of an annular chamber filled with lubricant.

* * * * *